United States Patent
Li et al.

(10) Patent No.: US 12,432,674 B2
(45) Date of Patent: Sep. 30, 2025

(54) METHOD AND APPARATUS FOR RADIO COMMUNICATIONS

(71) Applicant: Nordic Semiconductor ASA, Trondheim (NO)

(72) Inventors: Wei Li, Trondheim (NO); Eivind Sjøgren Olsen, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 18/845,302

(22) PCT Filed: Mar. 10, 2023

(86) PCT No.: PCT/EP2023/056193
§ 371 (c)(1),
(2) Date: Sep. 9, 2024

(87) PCT Pub. No.: WO2023/170276
PCT Pub. Date: Sep. 14, 2023

(65) Prior Publication Data
US 2025/0081132 A1    Mar. 6, 2025

(30) Foreign Application Priority Data
Mar. 10, 2022 (GB) .................... 2203373

(51) Int. Cl.
*H04W 56/00* (2009.01)
*H04W 28/06* (2009.01)

(52) U.S. Cl.
CPC ....... *H04W 56/0015* (2013.01); *H04W 28/06* (2013.01)

(58) Field of Classification Search
CPC ................ H04W 56/0015; H04W 28/06
See application file for complete search history.

(56) References Cited

U.S. PATENT DOCUMENTS

| | | | |
|---|---|---|---|
| 5,724,515 A | 3/1998 | Barnes et al. | |
| 6,965,636 B1 * | 11/2005 | DesJardins | ........... H04L 1/0006 714/751 |
| 2014/0086125 A1 | 3/2014 | Polo et al. | |

FOREIGN PATENT DOCUMENTS

EP    1 701 244 A1    9/2006

OTHER PUBLICATIONS

International Search Report and Written Opinion for PCT/EP2023/056193, mailed Jun. 2, 2023, 12 pages.

(Continued)

*Primary Examiner* — Ayanah S George
(74) *Attorney, Agent, or Firm* — Klarquist Sparkman, LLP (57) ABSTRACT

A radio communication system, comprising a transmitter and a receiver wherein the transmitter is configured to transmit a multi-block request including control and timing information relating to a subsequent multi-block transmission, the receiver is configured to receive and decode said multi-block request, the transmitter is configured to subsequently transmit the multi-block transmission, wherein the multi-block transmission comprises a series of discrete blocks. Each block comprises a respective data payload and a synchronisation portion, and each synchronisation portion enables synchronisation between the transmitter and receiver when used in combination with the control and timing information, independently of receipt of other blocks in the multi-block transmission.

14 Claims, 7 Drawing Sheets

(56) References Cited

OTHER PUBLICATIONS

IPO Search Report under Section 17 for Great Britain Application No. 2203373.2, dated Aug. 11, 2022, 4 pages.

* cited by examiner

METHOD AND APPARATUS FOR RADIO COMMUNICATIONS

CROSS REFERENCE TO RELATED APPLICATIONS

This is the U.S. National Stage of International Application No. PCT/EP2023/056193, filed Mar. 10, 2023, which was published in English under PCT Article 21 (2), which in turn claims the benefit of Great Britain Application No. 2203373.2, filed Mar. 10, 2022. The Great Britain application is incorporated herein in its entirety.

BACKGROUND OF THE INVENTION

This invention relates to improving the throughput of data transmitted from one device to another in a radio communications system which includes, for example, Bluetooth™.

Intermittent sources of interference in radio communication systems can be hard to predict or detect in advance, and can cause the loss of transmitted packets between radio devices. These intermittent sources, such as empty WiFi packets, may not be detected during a time period where the noise level of a frequency band is checked before a transmitter sends information. Therefore, transmission of data at the given frequency which is being used intermittently by another device is vulnerable to interference in the form of short bursts of noise. This "bursty" noise may cause the loss of transmitted packets, and as a result both synchronisation information and payload data may be lost. In some cases, all of the payload from the packet may be lost, even if the burst of noise only affects a small section of the signal carrying the packet.

There are known methods to improve the robustness of data transmission, including using interleaved data packets. In an interleaving solution, data is shuffled rather than just being sent in one block of data payload in the packet. The receiver then reverses the known shuffle to reconstruct the packet, which is still possible if some interference has occurred. However, the receiver needs to wait until the whole data packet has been received before reconstructing the packet, increasing latency.

It is also known to split the payload of one packet into multiple smaller blocks, each with a checksum applied to it. By splitting the packet into smaller blocks, the collision loss in the presence of bursty noise sources is reduced; only the affected blocks are lost to interference. However, if one or more of the smaller code blocks within the packet, or the header of the radio packet is lost, critical information may be corrupted leading to complete loss of receiver's ability to decode any of the blocks in the received packet. This would prevent the successful receipt of other blocks in the payload of the packet, even if they are unaffected by the source of bursty noise.

SUMMARY OF THE INVENTION

From a first aspect, the invention provides a radio communication system, comprising a transmitter and a receiver wherein:
the transmitter is configured to transmit a multi-block request including control and timing information relating to a subsequent multi-block transmission;
the receiver is configured to receive and decode said multi-block request;
the transmitter is configured to subsequently transmit the multi-block transmission, wherein the multi-block transmission comprises a series of discrete blocks, each block comprising a respective data payload and a synchronisation portion, each synchronisation portion enabling synchronisation between the transmitter and receiver when used in combination with the control and timing information, independently of receipt of other blocks in the multi-block transmission.

From a second aspect, the invention provides a radio transmitter configured to:
transmit a multi-block request including control and timing information relating to a subsequent multi-block transmission; and
subsequently transmit the multi-block transmission, wherein the multi-block transmission comprises a series of discrete blocks, wherein each block comprises a respective data payload and a synchronisation portion; each synchronisation portion enabling synchronisation between the transmitter and a receiver when used in combination with the control and timing information, independently of receipt of other blocks in the multi-block transmission.

From a third aspect the invention provides a radio receiver configured to:
receive a multi-block request including control and timing information relating to a subsequent multi-block transmission; and
subsequently receive the multi-block transmission, wherein the multi-block transmission comprises a series of discrete blocks, wherein each block comprises a respective data payload and a synchronisation portion; each synchronisation portion enabling synchronisation between a transmitter and the receiver when used in Thus it will be seen that, in accordance with at least embodiments of the invention, a multi-block request with information for decoding a multi-block transmission is transmitted ahead of sending the multi-block transmission itself. The Applicant has appreciated that there is a balance between providing each block in a multi-block transmission with sufficient information to enable decoding thereof, and excessive overhead of resource used in each block for this purpose. Pre-notification of some of this information using the multi-block request may advantageously reduce the required overhead for each block in the multi-block transmission. This leaves more resource for transmission of payload, However, by including a synchronisation portion in each block in the multi-block transmission, even if synchronisation is lost due to interference during receipt of the multi-block transmission, the receiver is capable of re-establishing synchronisation. This increases data throughput, and by consequence minimises power use and scheduling time associated with needing to re-transmit the lost packet.

Using a multi-block format may be advantageous for recovering data packets affected by burst interference compared to an interleaving method by decreasing latency. In a multi-block transmission, incoming packets can be decoded and processed in parallel with receiving them, rather than waiting until the full packet has been received.

In a set of embodiments in which the transmitter and receiver are configured for two-way communication, the receiver is configured to transmit a multi-block response to the transmitter following receipt of the multi-block request. This enables the transmitter to ensure that the multi-block request was subsequently received. In a set of embodiments the transmitter is configured to transmit the multi-block transmission only after receipt of said multi-block response.

Alternatively, the transmitter can be operated in broadcast mode, whereby the transmitter is configured to transmit a plurality of multi-block request packets, each comprising the same control and timing information. The control and timing information in each request packet indicates the same timing anchor position for the transmission of the multi-block transmission. The repeated transmission may reduce the risk of the receiver not obtaining the control and timing information in absence of a response from the receiver. When operating in broadcast mode, the multi-block request packet could be received by any number of receivers.

In a set of embodiments, the multi-block request packet and multi-block response packet comprise a synchronisation word, a payload portion, and a cyclic redundancy check.

As well as the portions of the packet described above, the multi-block request and multi-block response packets may comprise an access address field which provides link identification information, a rate indicator field specifying the coding and modulation of the payload portion, a length field specifying the length of the payload portion of the multi-block request packet, a header control field comprising sequencing information, and a header cyclic redundancy check. The header cyclic redundancy check may operate as a checksum for the rate indicator, length and header control fields, which may be able to establish when interference has caused an error to occur.

In a set of embodiments, the payload portion of the multi-block request packet comprises the control and timing information, wherein the control and timing information comprises a plurality of different information fields. Said plurality of fields may comprise the length of each block in the multi-block transmission, the number of blocks in the multi-block transmission, the rate of transmission of the blocks in the multi-block transmission, and the offset time between transmission of the multi-block request packet, and the time at which the multi-block transmission will be transmitted.

In a set of embodiments, the payload portion of the multi-block response packet comprises zero bytes of information. This may advantageously reduce the overhead of resources required for the multi-block response packet.

Thus, in exchanging the multi-block request and multi-block response packets, which are each checked for integrity, the transmitter can determine whether the control and timing information is transmitted to the receiver before sending the multi-block transmission.

In a set of embodiments, each block in the multi-block transmission comprises a cyclic-redundancy check which is used to confirm the integrity of each respective block. Splitting the payload of the multi-block transmission into separate blocks, each with a respective cyclic redundancy check, may advantageously isolate parts of the packet which have been affected by bursts of noise. If one block has been lost due to interference, it can be identified, and other blocks in the multi-block transmission may still be successfully decoded. Each block may further comprise a block identification field, although this may not be essential if sufficient timing and control information has been sent in the multi-block request.

Although there may be situations in which it would be advantageous to have them different, in a set of embodiments, the synchronisation portions in each block of the multi-block transmission are the same as each other.

The synchronisation portions used in the multi-block request and/or multi-block response could also be the same as the synchronisation portion or one of the synchronisation portions used in the multi-block transmission, however in a set of embodiments it is different, preferably with a low cross-correlation therebetween. This allows the synchronisation portion(s) used in the multi-block transmission to be reserved just for that type of transmission. This addresses a problem identified by the Applicant whereby use of a synchronisation portion for each block of the multi-block transmission may cause erroneous attempts at synchronisation by other radio devices in the communication system. This is due to the fact that in standard protocols, a synchronisation word would normally occur at the beginning of a new data packet. The reservation of synchronisation words that can appear repeatedly, mid-way through a packet may help to prevent this occurring. By contrast the synchronisation portion used in the multi-block request and/or multi-block response may be a 'standard' one used for other transmission types in the system.

In a set of embodiments therefore, the synchronisation portion in each of the multi-block request and multi-block response packets is chosen such that it has a low cross-correlation with the synchronisation portion used in each block in the multi-block transmission.

The synchronisation portion in the multi-block request packet is typically the same as the synchronisation portion in the multi-block response packet, but they may be different.

In a set of embodiments, each of the synchronisation portions used in the multi-block request, multi-block response, and the multi-block transmission are taken from a predefined set of synchronisation words all with low cross-correlation with respect to each other.

In a set of embodiments where the transmitter and receiver are configured to be in two-way communication, after the receiver receives a multi-block request packet, the receiver listens for both the synchronisation word expected to follow in the multi-block transmission, and the synchronisation word used in the multi-block request packet. In this way, if the receiver were to receive the multi-block request packet synchronisation word again having already received a multi-block request, the receiver may determine that the multi-block response which the receiver sent was not received by the transmitter. In this case, the receiver may re-transmit a multi-block response packet. Equivalently, if the transmitter does not receive a multi-block response packet, the transmitter may send another multi-block request packet.

In a set of embodiments where the transmitter is configured to operate in broadcast mode, the receiver may be configured to first listen for the synchronisation word used in any of the repeated multi-block request packets, and subsequently listen for the synchronisation word expected to follow in the multi-block transmission. The receiver may therefore not need to listen for a plurality of multi-block request packets from the transmitter before receiving the multi-block transmission. The multi-block request packets may contain the timing anchor information for the start of the multi block transmission, therefore receiving one of the request packets may be sufficient to obtain the timing anchor of the start of the multi-block transmission.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain embodiments of the invention will now be described, by way of example only, with reference to the accompanying drawings, in which.

DETAILED DESCRIPTION

Figure 1:
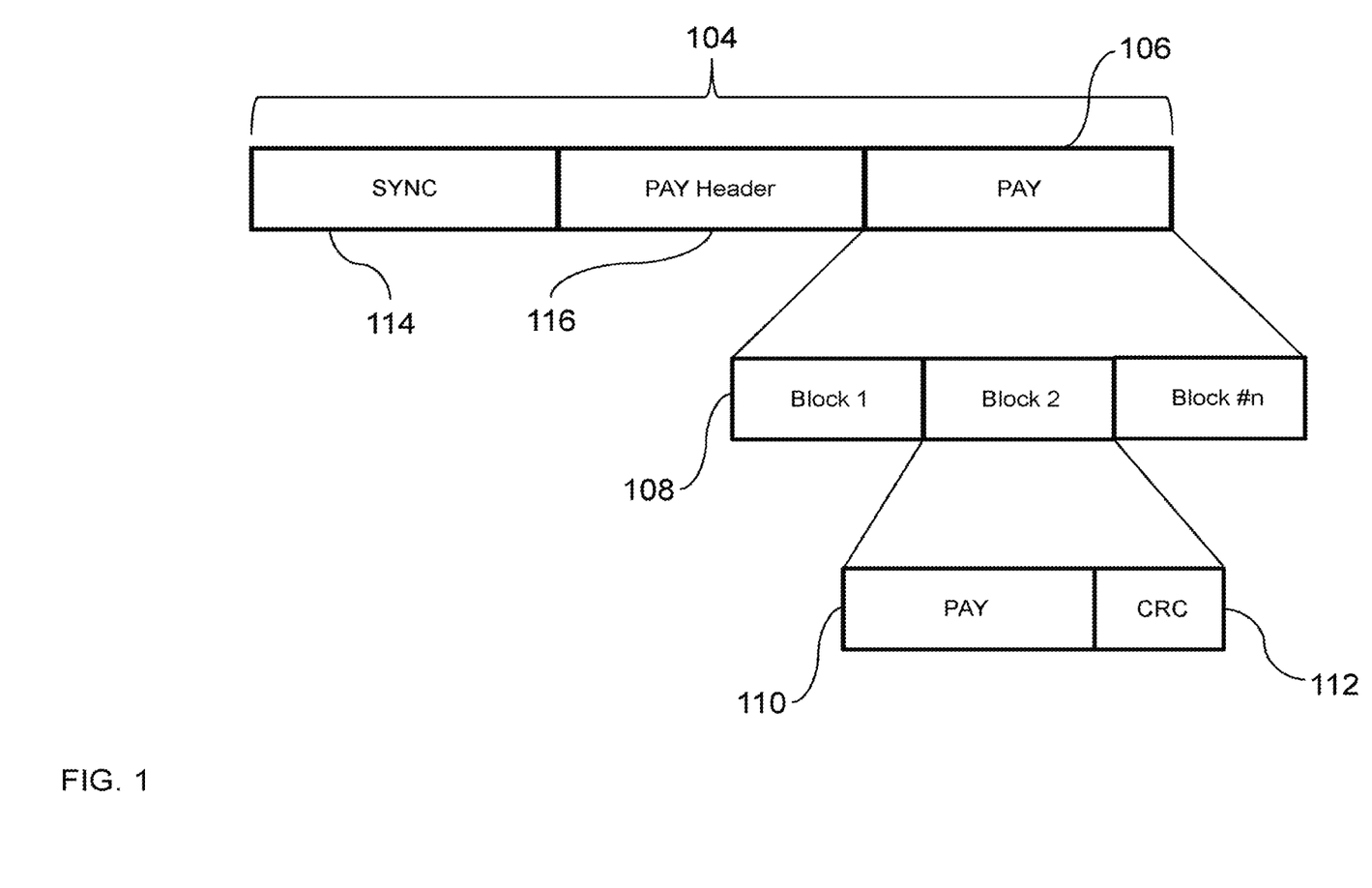
FIG. 1 shows the structure of a prior art packet in a radio communication system.

FIG. 1 shows the structure of a data packet 104 which is designed to increase data throughput using a multi-block method as known in the art. The packet payload portion 106 is split into a plurality of blocks 108. Each block has a block payload portion 110 and a cyclic redundancy check (CRC) portion 112. The data packet also has a front end portion 114 and payload header portion 116. The front end portion 114 provides link identification information, and the payload header portion 116 proves timing information for the following blocks 108 in the payload 106.

Adding the CRC 112 at the end of each block 108 allows the receiver 102 to identify when a block has been corrupted by noise interference. However, for the data packet as shown in FIG. 1, there are a number of vulnerabilities in the case of interference, which could lead to data loss. If the first block 108 in the multi-block transmission is lost, the receiver would lose symbol timing, phase, frequency and frame synchronisation. This would prevent the receiver from being able to recover synchronisation for the rest of the blocks. If the payload header portion 116 is lost, the block timing for the multi-block transmission would be lost. The receiver would not know where the different blocks 108 start or end, how many blocks there are, or how many bits make up each block. High data throughput systems are generally designed to have a variable block rate, so in this case the receiver would also lose access to a rate indicator, as well as the length field of the expected data. If interference causes the loss of the front end portion 114, the receiver would not be able to identify the source of the transmission due to loss of link identification information.

One solution would be to include all of this information which may be lost in each block 108. However, this would require a significant amount of overhead in each block 108, leaving fewer resources available for the payload of data.

Figure 2:
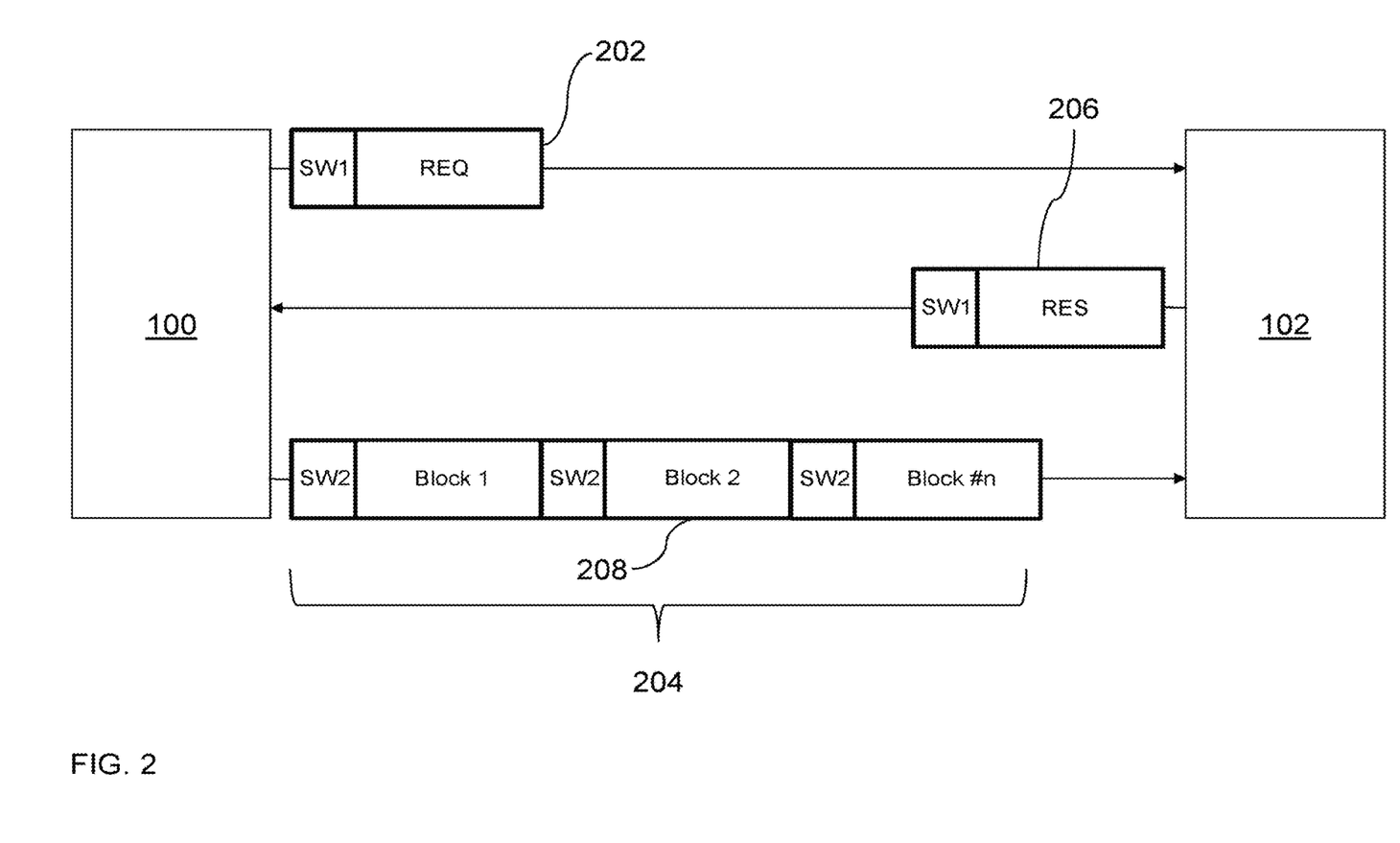
FIG. 2 shows a radio system in accordance with the present invention.

FIG. 2 shows a solution in accordance with the present invention involving pre-negotiation of timing and control information. A transmitter 100 sends a multi-block request packet 202 to a receiver 102. As will be well understood by those skilled in the art, a number of standard modules such as processors, oscillators, filters, amplifiers, digital to analogue converters (DACs) and analogue to digital converters (ADCs) are provided in the radio transmitter 100 and receiver 102 but the description of these is omitted for the sake of brevity.

As described in more detail below, the multi-block request packet 202 includes control and timing information about a multi-block transmission 204 which will be sent subsequently. The receiver 102 decodes the control and timing information, then sends an acknowledgement in the form of a multi-block response packet 206 back to the transmitter 100. Once this acknowledgement is received by the transmitter 100, the transmitter 100 sends the multi-block transmission 204. The multi-block transmission contains a variable number of blocks 208.

Figure 3:
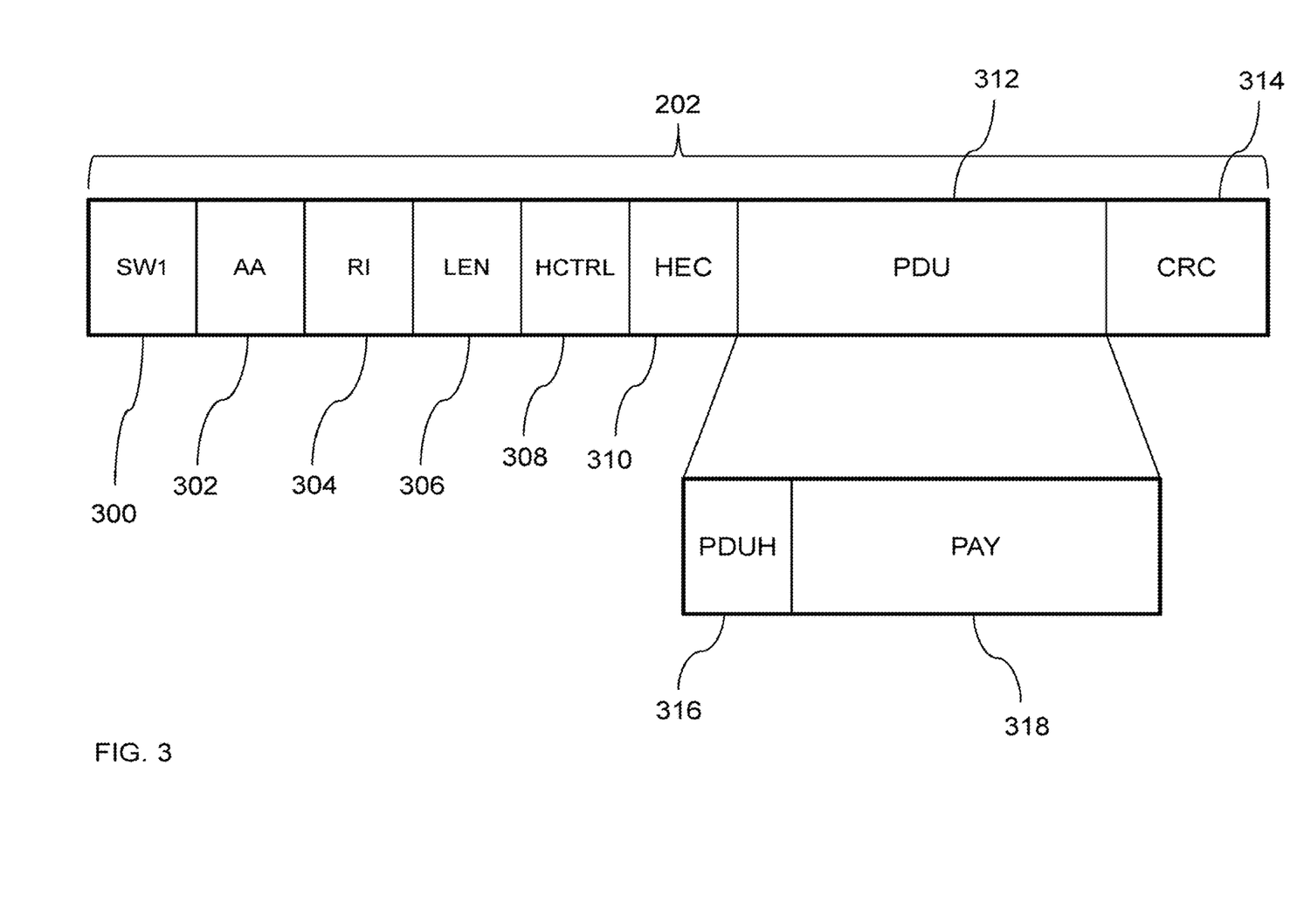
FIG. 3 shows the structure of a multi-block request and multi-block response packets in accordance with the present invention.

FIG. 3 shows the structure of the multi-block request packet 202. The multi-block request packet 202 includes a synchronisation portion in the form of a synchronisation word 300, access address 302, rate indicator 304, length field 306, header control bits 308, header error check 310, payload data unit (PDU) 312 and PDU CRC 314. The synchronisation word 300 is used to communicate frequency, phase, symbol timing and frame timing to the receiver for the multi-block request packet 202. The access address 302 provides the logical address of the multi-block request packet, which is used for link separation and identification. The rate indicator 304 specifies the coding and modulation of the PDU 312 and PDU CRC 314 portions of the packet, and the length field 306 gives the number of bytes of the payload data unit 312. The header control bits 308 may include sequencing information for acknowledgements (ACK/NACKs), or optional field flags, whilst the header error check 310 provides a CRC type integrity checksum for header fields (304, 306 and 308), and may also check parts of or the whole of the access address 302. The PDU CRC 314 provides a checksum for the content of the PDU 312.

The PDU 312 of the multi-block request packet 202 contains the control information which is being pre-negotiated. The PDU 312 is split into a payload header 316, and an actual payload portion 318. The payload portion 318 contains all information needed to calculate timing of the individual blocks in the following multi-block transmission, including block segment length and rate, the number of blocks in the multi-block transmission 204, the offset time from beginning of the request packet 202, and any other optional control fields. The payload header 316 may include additional link control information.

The multi-block response packet 206 has the same structure as shown for the multi-block request packet 202, with the difference between the two being that for the response packet, the payload 318 and payload header 316 are ideally zero bytes in length. All the required information to indicate the response is instead contained in the header fields of the multi-block response. This may comprise an ACK/NACK in the header control bits 308.

Figure 4:
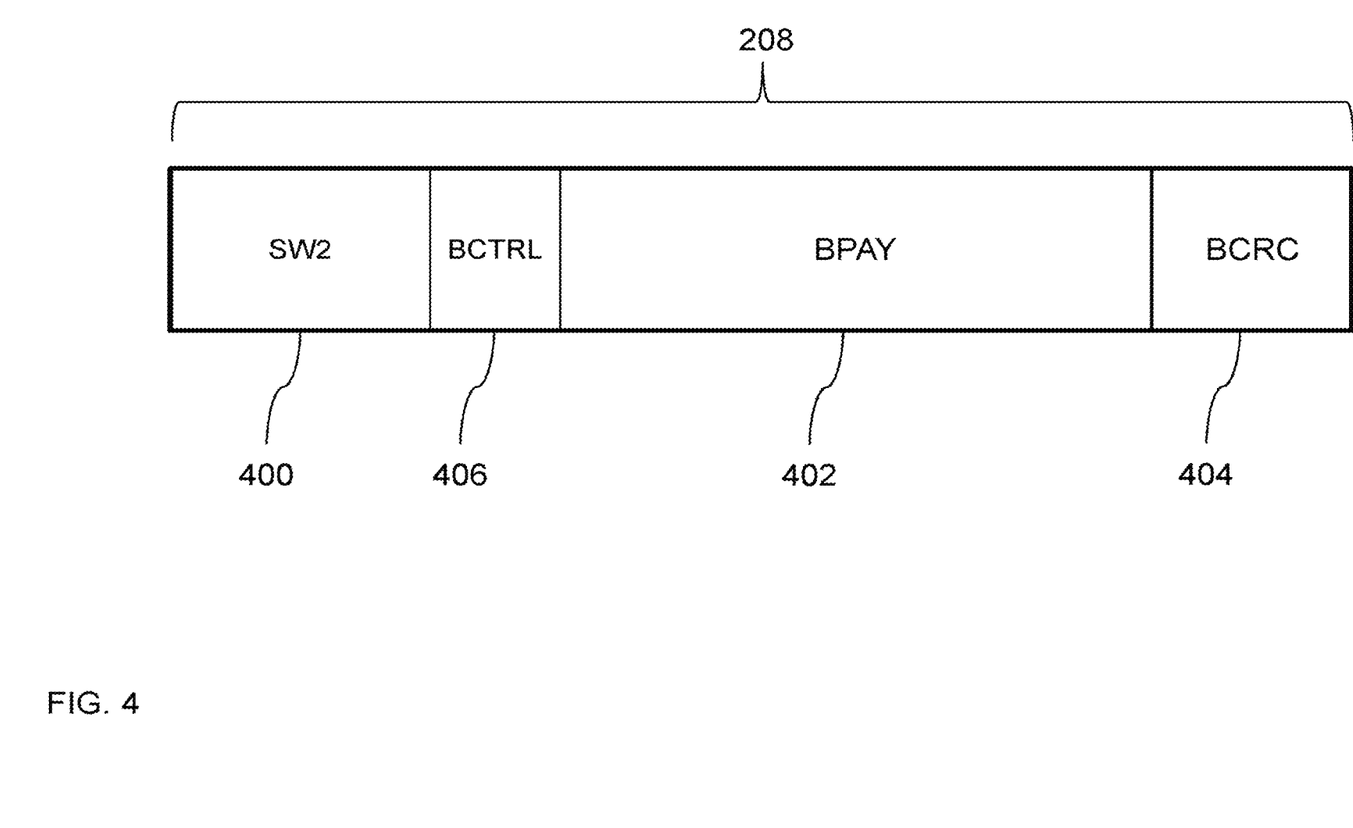
FIG. 4 shows the structure of a block in a multi-block transmission in accordance with the present invention.

FIG. 4 shows the structure of each block 208 in the multi-block transmission 204. Each block 208 comprises a synchronisation portion in the form of a synchronisation word 400, payload 402, a CRC checksum 404 for the block, and optional control information 406. The synchronisation word 400 is used for frequency, phase, symbol timing and frame timing of each block.

The Applicant has appreciated that including a synchronisation word 400 in every block 208 means that another radio device may attempt to synchronise using the synchronisation word 400, as if it were a starting synchronisation word of a new packet being sent with standard protocol (i.e. not a multi-block transmission). Usually, a link address would follow the synchronisation word. However, in the case of the blocks 208, the synchronisation word is immediately followed by the payload 402 or optional control information 406. Therefore, the victim device may attempt to use some of the payload as an address to synchronise with, and will be unsuccessful.

To solve this problem, it has been appreciated that there should ideally be good separation between the synchronisation words 400 used in the multi-block transmission 204, and the synchronisation words used for standard connection packets, such as synchronisation word 300 used in the multi-block request 202.

Therefore, the synchronisation word 300 used in the multi-block request is designed such that it has a low cross-correlation with the synchronisation word 400 used for the plurality of blocks 208. Ideally, the synchronisation word 400 used for the blocks 208 is reserved such that no other radio apparatus uses said synchronisation word 400 when transmitting radio signals. The synchronisation word 300 used for multi-block request 202 and the multi-block response 206 can be taken from a set of synchronisation words with low cross-correlation match to the synchronisation word 400.

There is a further possibility that choice of synchronisation words could from the low cross-correlation set could enhance link identification. If using the sync word to identify the link where it is exclusively used, errors involving devices attempting to synchronise with the wrong signal could be further guarded against.

Following the synchronisation word 400 in the block 208, the payload 402 may include information such as application data, and the checksum 404 is used to detect whether interference has affected the block 208. The optional control information 406 could include a block ID, but in general this is not essential as a result of the pre-negotiation exchanging the control and timing information as described above. After receiving the multi-block transmission, the receiver will know the timing anchor position and the length of each block, and by consequence, the time of receipt of each block can indicate the block ID.

Timing information could be updated for each block to provide extra synchronisation information. However, it has been found that the accuracy of the receiver's clock is sufficiently accurate that timing updates at the start of each block would be unnecessary. The extra energy consumption would not be justified for any small gain in re-establishing synchronisation if interference were to occur. Not updating the timing information upon receipt of each block also helps to avoid the occurrence of a 'timing highjack'. If timing were to be updated every time, there would be a danger that a different radio device's timing may be disrupted if erroneously trying to sync with the multi-block transmission.

Figure 5:
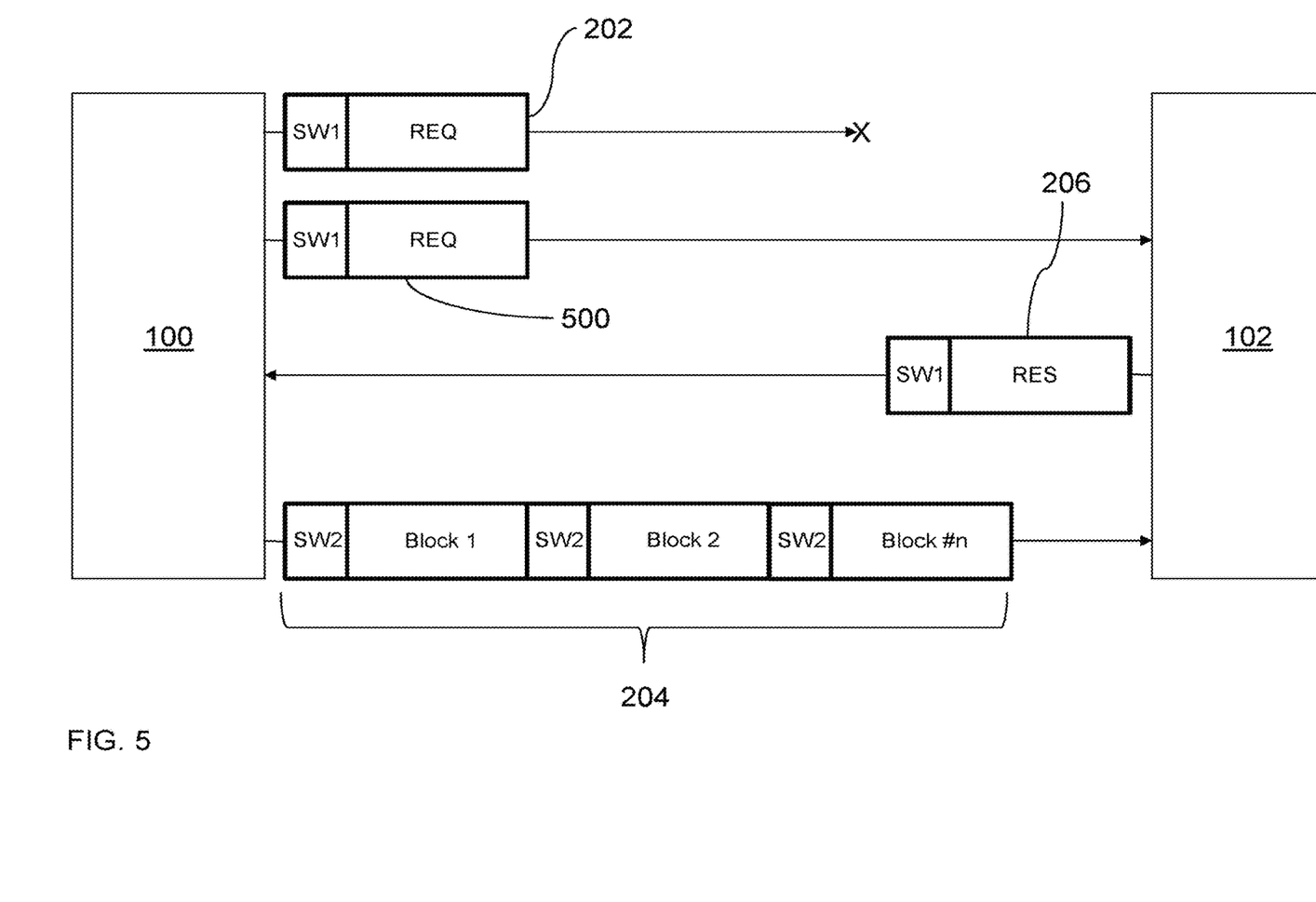
FIG. 5 shows a protocol for operating a radio system in accordance with the present invention when a multi-block request packet is lost.

FIG. 5 shows a protocol for ensuring that the multi-block request packet 202 is received by the receiver 102, in the event that the multi-block request packet 202 is lost. The transmitter 100 waits for receipt of the multi-block response packet 206, and if no response packet 206 is received during the expected time frame after sending the multi-block request packet 202, a second multi-block request packet 500 is transmitted. After the transmitter 100 receives the response packet 206, the multi-block transmission 204 is sent as described before.

Figure 6:
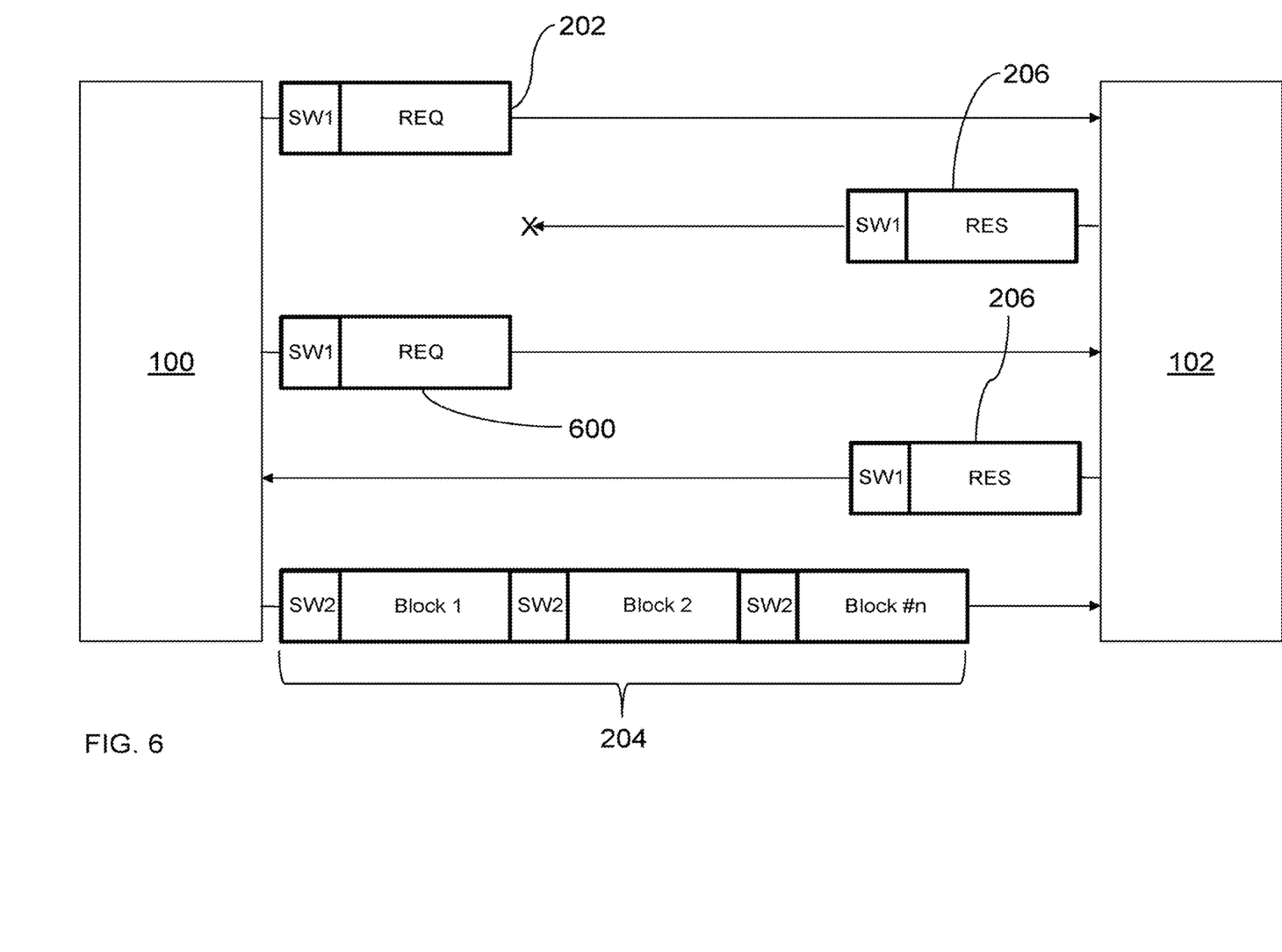
FIG. 6 shows a protocol for operating a radio system in accordance with the present invention when a multi-block response packet is lost.

FIG. 6 shows how the protocol responds in the event that the multi-block response packet 206 is lost. The transmitter 100 waits for receipt of the multi-block response packet 206, and if no response packet 206 is received during the expected time frame after sending the multi-block request packet 202, a second multi-block request packet 600 is transmitted. Having received the second multi-block request packet 600, the receiver sends a second multi-block response packet 206. After the transmitter 100 receives the response packet 206, the multi-block transmission 204 is sent as described before.

In order to facilitate this protocol, after receiving the multi-block request packet 206, the receiver listens for both the synchronisation word 300 used in the multi-block request 206, and the synchronisation word 400 expected to follow in the multi-block transmission 204. The low cross-correlation between the two synchronisation words allows the receiver to clearly distinguish between the connection request packet 206 and the multi-block transmission 204.

Figure 7:
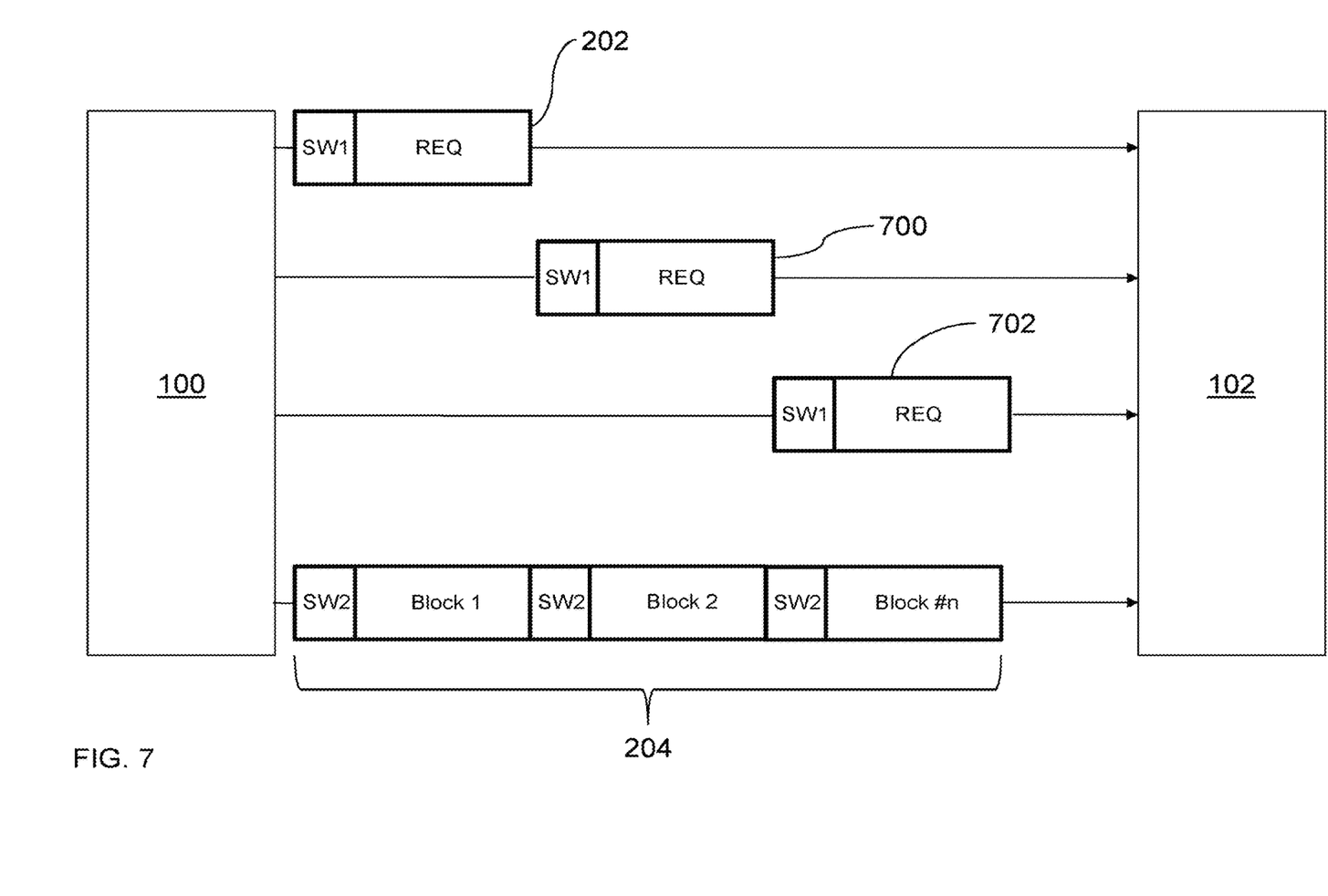
FIG. 7 shows a radio system where a transmitter is configured to operate in broadcast mode in accordance with an embodiment of the present invention.

FIG. 7 shows the transmitter 100 operating in a broadcast mode. The transmitter 100 does not wait for receipt of the multi-block response packet 206, instead, a plurality of further multi-block request packets are transmitted. Further request packets 700 and 702 are shown in FIG. 7, although the number of request packets sent may vary. Each request packet communicates the same control and timing information, pointing to the same timing anchor position for the start of the multi-block transmission 204. The transmitter subsequently sends the multi-block transmission 204 as described before.

The protocols described above for exchanging multi-block request and multi-block response packets provide robust protection against "bursty" types of interference. The likelihood of the pre-negotiation of timing and synchronisation information failing is reduced by waiting for the multi-block response packet, or sending repeated multi-block request packets. Splitting the PDU into multiple blocks, and including a synchronisation portion in each block increases the throughput of data in the presence of interference bursts, whilst the pre-negotiation reduces the required overhead for each block.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A radio communication system, comprising a transmitter and a receiver wherein:
    the transmitter is configured to transmit a multi-block request including control and timing information relating to a subsequent multi-block transmission;
    the receiver is configured to receive and decode said multi-block request;
    the transmitter is configured to subsequently transmit the multi-block transmission, wherein the multi-block transmission comprises a series of discrete blocks, each block comprising a respective data payload and a synchronisation portion; each synchronisation portion enabling synchronisation between the transmitter and receiver when used in combination with the control and timing information, independently of receipt of other blocks in the multi-block transmission.

2. The method of claim 1, where the transmitter is configured to send a plurality of multi-block requests, each comprising the control and timing information;
    wherein the control and timing information in each multi-block request indicates a consistent timing anchor position for the transmission of the multi-block transmission.

3. The method of claim 1, wherein the multi-block request comprises a second synchronisation portion different to said synchronisation portion of each block.

4. The method of claim 3, wherein the synchronisation portion used in each block of the multi-block transmission, and the second synchronisation portion in the multi-block request, comprise synchronisation words taken from a predefined set of synchronisation words with low cross-correlation.

5. The method of claim 3, wherein after receiving the multi-block request, the receiver listens for the second synchronisation portion used in the multi-block request.

6. The method of claim 1, wherein the synchronisation portions in each block of the multi-block transmission are the same as each other.

7. The method of claim 1, wherein the control and timing information comprises:
   a length of each block in the multi-block transmission,
   a number of blocks in the multi-block transmission, and;
   a timing anchor position for the transmission of the multi-block transmission.

8. The method of claim 1, wherein the receiver is configured to transmit a multi-block response to the transmitter following receipt of the multi-block request, and the transmitter is configured to transmit the multi-block transmission only after receipt of said multi-block response.

9. The method of claim 8, wherein the multi-block response comprises a second synchronisation portion that is different to the synchronisation portion of each block of the multi-block transmission.

10. The method of claim 1, wherein each block in the multi-block transmission comprises a cyclic-redundancy check.

11. A radio transmitter configured to:
   transmit a multi-block request including control and timing information relating to a subsequent multi-block transmission; and
   subsequently transmit the multi-block transmission, wherein the multi-block transmission comprises a series of discrete blocks, wherein each block comprises a respective data payload and a synchronisation portion; each synchronisation portion enabling synchronisation between the transmitter and a receiver when used in combination with the control and timing information, independently of receipt of other blocks in the multi-block transmission.

12. A radio receiver configured to:
   receive a multi-block request including control and timing information relating to a subsequent multi-block transmission; and
   subsequently receive the multi-block transmission, wherein the multi-block transmission comprises a series of discrete blocks, wherein each block comprises a respective data payload and a synchronisation portion; each synchronisation portion enabling synchronisation between a transmitter and the receiver when used in combination with the control and timing information, independently of receipt of other blocks in the multi-block transmission.

13. The radio receiver of claim 12, configured to transmit a multi-block response to the transmitter following receipt of the multi-block request.

14. The radio receiver of claim 12, wherein after receiving the multi-block request, the receiver is configured to listen for a second synchronisation portion used in the multi-block request.

\* \* \* \* \*